United States Patent [19]

Figge et al.

[11] Patent Number: 5,501,558
[45] Date of Patent: Mar. 26, 1996

[54] ANTI-FRICTION TEE-NUT WITH DEFLECTED EDGES

[75] Inventors: Siegfried Figge, Holland Landing; Martin K. Leistner, Toronto, both of Canada

[73] Assignee: Sigma Tool & Machine, Scarborough, Canada

[21] Appl. No.: 295,389

[22] Filed: Aug. 25, 1994

[51] Int. Cl.[6] .................................................. F16B 37/00
[52] U.S. Cl. .................................................. 411/176; 411/427
[58] Field of Search ....................................... 411/176, 177, 411/179, 180, 181, 183, 427

Primary Examiner—Steven N. Meyers
Assistant Examiner—Tuyet-Phuong Pham

[57] ABSTRACT

An anti-friction Tee-nut for use in Tee-nut setting machines having a feed mechanism, and the Tee-nut having a threaded sleeve portion, a flange portion substantially normal to the threaded sleeve portion around one end thereof, the flange portion defining upper and lower surface planes, and the flange portion being adapted to be received in the feed mechanism of a setting machine, and, deflected portions deflected out of the upper surface plane of the flange portion along the leading and trailing end edges of the flange.

1 Claim, 2 Drawing Sheets

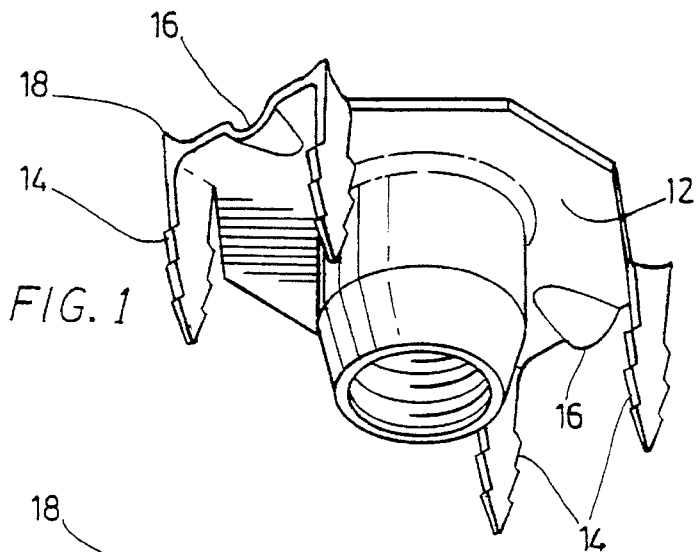
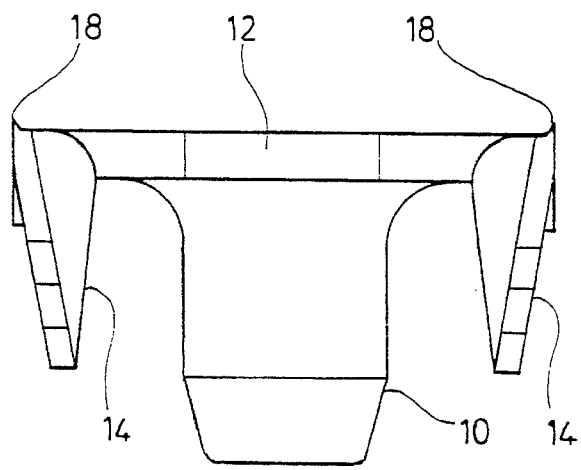
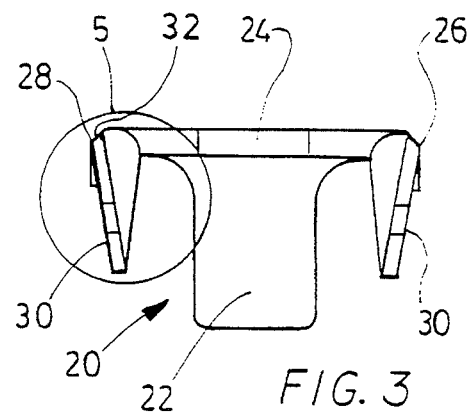
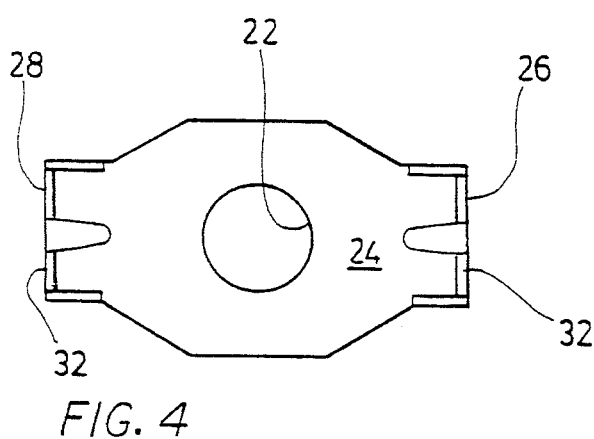
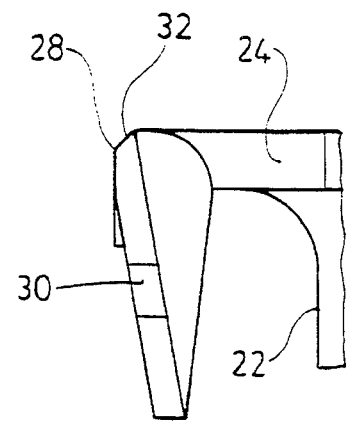

ANTI-FRICTION TEE-NUT WITH DEFLECTED EDGES

FIELD OF THE INVENTION

The invention relates to an anti-friction Tee-nut having a threaded sleeve, and flanges extending normal to the sleeve, and prongs extending substantially normal to the flanges for embedment in a work piece, which are formed out of sheet metal.

In particular the invention relates to such an anti-friction Tee-nut for use in Tee-nut setting machines having a feed apparatus for feeding the Tee-nuts to the setting machine, and in which the problems created by Tee-nut imperfections or burrs are reduced.

BACKGROUND OF THE INVENTION

Tee-nuts are widely used in the manufacture and assembly of wood products such as wooden furniture and the like. The Tee-nuts are embedded in many positions in the wood. They provide a means for securing two pieces of a wooden product together or for securing items to a wooden product, by means of threaded fasteners fitting in the threaded sleeves of the Tee-nuts.

As is well known, such Tee-nuts are embedded in the work piece by means of a high speed setting machine, used on a production line. In many cases the setting machine will incorporate a feed mechanism consisting of a gravity feed slide, and a hopper. The hopper vibrates and introduces the Tee-nuts into the slide, and the Tee-nuts then slide down the slide under the influence of gravity until they reach the setting position of the apparatus. Typical Tee-nut setting machines are shown in U.S. Pat. Nos. 3,460,217, and 4,821,940. It is, however, well known that from time to time the Tee-nuts in the slide may jam. In addition, the movement of the Tee-nuts down and/or along the slide tends to cause relatively rapid wear, which increases the likelihood of feed problems. One of the principle causes of feed problems is the fact that the Tee-nuts are formed by stamping out of sheet metal. In the normal stamping operation, portions of the sheet metal are displaced out of the plane of the sheet metal, leaving minute imperfections or burrs. These burrs cause friction within the slide, which in itself can cause the Tee-nuts to jam. In addition, however, as these burrs pass along the slide they cause rapid wear and in fact form grooves in the metal of the slide. The burrs, and grooves may interfere with the free movement of the Tee-nuts in the slide so that miss-feeds become more frequent.

In another form of Tee-nut feed mechanism, the Tee-nuts are formed into a strip by means of, for example adhesive tape or the like. The location of the burrs on the Tee-nuts is such that they can interfere with the tape, and make it difficult to adhere to, or may cause it to tear.

Tee-nut setting machines may be designed to punch the Tee-nut downwardly into a work piece. Other designs of machines are known which punch the Tee-nut upwardly into a work piece. The problems created by the burrs on the Tee-nuts arise in both types of machines.

The location of the burrs is such that they occur on the edges of the flanges, which are formed around the threaded sleeve. In the past the only way to limit the formation of the burrs was to resharpen the tooling with which the Tee-nuts were made, at frequent intervals. This in turn shortens the life of the tooling dramatically, since repeated sharpening operations would cause it to wear down, more frequently than normal operation would require. Clearly, it would be desirable to provide a Tee-nut with a smooth facefree of burrs.

This, therefore, is one general objective of the invention.

Another alternative solution, however, is to provide a Tee-nut in which the burrs are still present, but in which the location of the sheet metal edges where the burrs are formed has been displaced, out of the plane of the metal surface of the flange so that the burrs no longer cause friction and abrasion in the feed slide. This, therefore, is another general objective of the invention.

Either the smoothing down of the burrs altogether, or the displacement of the burrs so that they are located in a position where they cannot cause friction and abrasion, will generally be satisfactory and provide a solution to the problem.

BRIEF SUMMARY OF THE INVENTION

With a view to satisfying the foregoing objectives the invention comprise an anti-friction Tee-nut for use in tee-nut setting machines having a Tee-nut feed guide mechanism and comprising; a threaded sleeve portion, a flange portion extending substantially normal to said threaded sleeve portion around one end thereof, said flange portion defining upper and lower planes, and said flange portion being adapted to be received in said feed guide mechanism of a setting machine, and, deflected portions deflected out of the upper plane of said flange portion along edges thereof.

The invention can provide that the deflected portions comprise generally angular surfaces, formed at an angle relative to said upper plane of said flange portion.

The invention can provide that the deflected portions comprise generally curved surfaces.

The invention can provide that the deflected portions comprise depressions formed along leading and trailing end edges of said flange portions.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 1 is a lower perspective of a typical prior art Tee-nut, showing burrs;

FIG. 2 is a side elevation of the Tee-nut of FIG. 1, both FIGS. 1 and 2 being labelled Prior Art;

FIG. 3 is a side elevation of one embodiment of anti-friction Tee-nut illustrating the invention;

FIG. 4 is a top plan view of the Tee-nut of FIG. 3;

FIG. 5 is an enlarged partial side elevation of FIG. 3 shown in the circle 5 of FIG. 3;

DESCRIPTION OF A SPECIFIC EMBODIMENT

Figure 6:
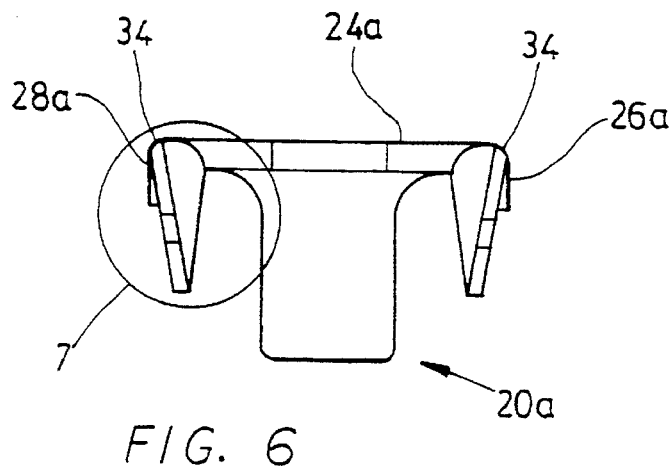
FIG. 6 is a side elevation illustrating a further embodiment of the invention.

Referring first of all to FIGS. 1 and 2, there is illustrated in perspective a typical Tee-nut of the type to which the invention relates. This illustration, and FIG. 2 are labelled PRIOR ART.

The Tee-nut as illustrated in FIGS. 1 and 2 embodies certain inventive features the subject of the earlier U.S. Patent referred to above, and in particular, provides a threaded sleeve 10, having a flat planar flange portion 12 extending around one end thereof substantially normal to the axis of the threaded sleeve. Struck out from the flange portion 12, are four prongs 14. In normal use, the sleeve is inserted into an already drilled hole in a wooden work piece, and the Tee-nut and prongs are forcibly driven into the work piece, with the prongs being embedded in the work piece around the hole securing the Tee-nut in position. In the particular Tee-nut as illustrated, there are generally U-shaped abutments 16, at opposite ends of the edges of the flanges. The flanges in this case form a generally eight-sided configuration in plan, in this embodiment, although other shapes can be used, and are known such as square, rectangular, or in some cases with arcuate end edges. One of the end edges is a leading edge and the other end edge is a trailing edge, when they are located in a feed slide of a Tee-nut setting machine. The purpose of the U-shaped abutments is to prevent the leading and trailing end edges of adjacent Tee-nuts from overriding one another and causing misfeeding in the slide. This feature is described in the aforesaid earlier U.S. Patent, and does not form part of the present invention. It is described here for the sake of completeness only.

As illustrated in FIG. 2, Tee-nuts of this type, and indeed Tee-nuts of almost all manufacturers are formed by stamping at high speed out of sheet metal. The stamping operation is such as to leave minute imperfections or burrs 18—18 on the leading and trailing edges of the Tee-nuts. The burrs are formed as part of the normal stamping process. The stamping process is carried out using a continuous strip of steel feed stock. Each Tee-nut must be severed from the strip, as it is completed. It is this severing operation that causes the imperfections along the leading and trailing end edges of the Tee-nuts. The burrs are highly abrasive, and as the Tee-nuts pass along the feed channel of the typical Tee-nut setting apparatus these burrs will abrade the interior of the channel and gradually form grooves in the channel, and which can cause misfeeding of the Tee-nuts.

In order to overcome this problem one solution provided by the invention is to provide an anti-friction Tee-nut 20 in which the leading and trailing edges of the Tee-nut are treated to smooth down, or displace the burrs, and leading and trailing edges, in the region of the prongs.

One embodiment of this invention is illustrated in FIGS. 3, 4, and 5. FIG. 3 which is a side elevation and FIG. 4 which is a plan, illustrates a Tee-nut 20, having a threaded sleeve 22 and a flange portion 24, which in this particular illustration is shown as octagonal in plan, but which could be of various different shapes, for example square, or rectangular, if desired. The flange portion is flat and planar and defines upper and under surface planes. The flange portion has side portions for fitting in a typical feed guide of a setting machine (not shown), and has leading and trailing end edges. The leading and trailing end edges 26 and 28 are formed with prongs 30. In order to eliminate the burrs of the prior art Tee-nuts the leading and trailing end edges are formed with angled edge profiles 32. In this way the burrs which would have been formed during the stamping out and severing operation, have been smoothed down in the formation of the angled edges 32. FIG. 5 illustrates an enlarged side elevational view of the trailing end edge portion of such a Tee-nut.

The manner in which the angled edge formations are manufactured may involve an additional stamping operation, or may be performed as a second operation in the same die as is used for severing the Tee-nuts one from another. However, whatever method is used it will be seen that the leading and trailing end edges of the flange of the Tee-nut are displaced, and that the burrs are smoothed down. Thus there are no longer any burrs to contact the interior of the feed track in a setting machine.

Figure 7:
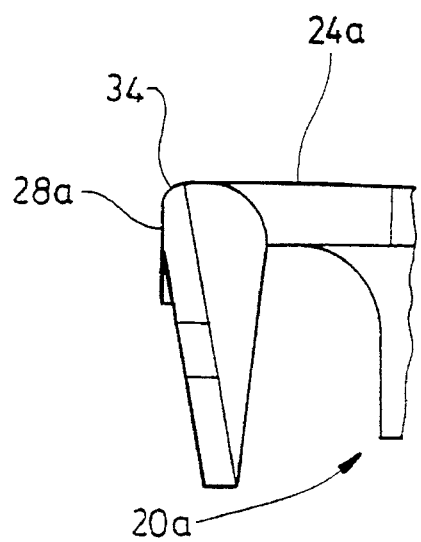
FIG. 7 is an enlarged side elevation of a portion of FIG. 6 shown in the circle 7 of FIG. 6.

Referring now to FIGS. 6 and 7, it will be seen that these Figures illustrate a further embodiment 20a of the invention. In this case the leading and trailing end edges 26a and 28a of the Tee-nut are formed with curved edge profiles 34. Again this may require a separate operations or may perhaps be performed as a further operation in the same die as is used for stamping and severing the Tee-nuts. In any event, the leading and trailing edge portions of the Tee-nuts are displaced, and the burrs are smoothed down, so that they are no longer present to abrade the interior of the feed guide mechanism of the setting machine.

Figure 8:
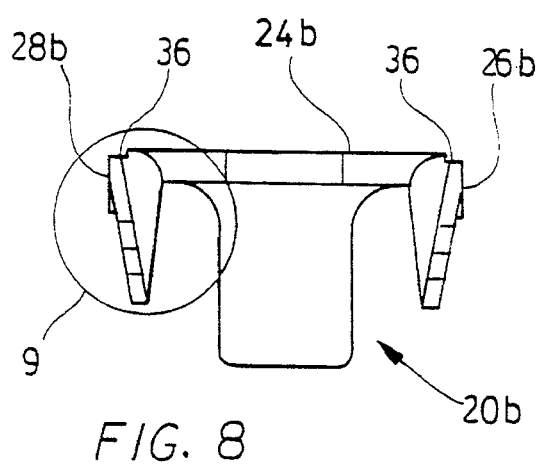
FIG. 8 is a side elevation illustrating a further embodiment of the invention, and, FIG. 9 is an enlarged side elevation of a portion of FIG. 8 shown in the circle 9 of FIG. 8.
Figure 9:
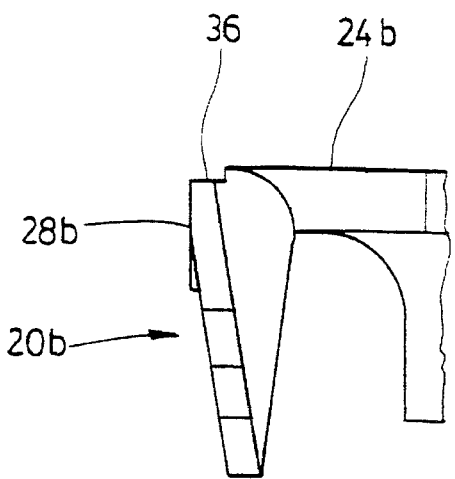

FIGS. 8 and 9 illustrate a still further embodiment 20b of the invention. In this case, the leading and trailing end edges 26b and 28b are formed with depressed or displaced edge portions 36—36. The edge portions 36 lie in a plane below the plane of the surface of the flange portion 24b. In this case, the burrs may still be present but since the edge portions on which the burrs are formed are depressed relative to the surface of the flange portions, the burrs will not come into contact with the interior of the feed guide mechanism, and consequently will not cause any problems.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. An anti-friction Tee-nut for use in Tee-nut setting machines having a Tee-nut feed mechanism and comprising;

a threaded sleeve portion;

a flat planar flange portion extending substantially normal to said threaded sleeve portion around one end thereof, said flange portion defining upper and lower surfaces in respective upper and lower planes, said threaded sleeve portion extending downwardly from said lower surface of said flange portion and said flange portion having side portion on either side which are planar and are adapted to be received in said feed mechanism of a setting machine, and, leading and trailing end flange edge portions, and said upper surfaces of said leading and trailing end flange edge portions being deflected downwardly out of said upper plane of said upper surface of said flange portion and deflection extending transversely from side to side of said leading and trailing end edge portions of said flange portion and wherein said deflected flange edge portions comprise depressions formed transversely along said leading and trailing end edges from side to side of said flange portions.

* * * * *